United States Patent [19]

Slob

[11] 3,987,617
[45] Oct. 26, 1976

[54] DISPLAY DEVICE FOR A COUNTING MECHANISM, SUCH AS A CLOCK OR WATCH

[75] Inventor: Arie Slob, Eindhoven, Netherlands

[73] Assignee: U.S. Philips Corporation, New York, N.Y.

[22] Filed: Apr. 10, 1975

[21] Appl. No.: 566,774

[30] Foreign Application Priority Data
Apr. 29, 1974  Netherlands.................... 7405724

[52] U.S. Cl. ................................. 58/50 R; 58/128; 240/6.43; 340/324 M; 350/160 LC
[51] Int. Cl.² ..................... G04B 19/30; G04B 19/34
[58] Field of Search .................. 58/50 R, 50 A, 128; 340/324 M, 334; 240/6.43; 40/52 B; 350/160 LC

[56] References Cited
UNITED STATES PATENTS

| | | |
|---|---|---|
| 2,745,243 | 5/1956 | Schumacher.......................... 58/50 R |
| 3,258,906 | 7/1966 | Demby................................. 58/50 R |
| 3,456,152 | 7/1969 | Andersen........................ 58/50 R X |
| 3,540,209 | 11/1970 | Zatsky et al. ....................... 58/50 R |
| 3,579,976 | 5/1971 | D'Muhala ............................ 58/50 R |
| 3,613,352 | 10/1971 | Giersiepen ........................... 58/50 R |
| 3,691,752 | 9/1972 | Whittier........................ 58/50 R X |
| 3,754,392 | 8/1973 | Daniels ................................ 58/50 R |
| 3,757,511 | 9/1973 | Burgess et al....................... 58/50 R |
| 3,844,105 | 10/1974 | Kashio ........................ 58/50 R X |
| 3,922,847 | 12/1975 | Culley et al......................... 58/50 R |

Primary Examiner—Stanley J. Witkowski
Attorney, Agent, or Firm—Frank R. Trifari; Carl P. Steinhauser

[57] ABSTRACT

A display device for a counting mechanism, for example, a clock or a watch. The electrodes for the counting positions, for example, hours, minutes and seconds, are arranged in concentric rings. The electrodes are divided per ring into groups which are interconnected in a special manner. The counter electrodes are arranged in one ring of which each electrode cooperates with one group of each above-mentioned ring of electrodes. The number of external connections of the display device is thus highly restricted.

6 Claims, 4 Drawing Figures

DISPLAY DEVICE FOR A COUNTING MECHANISM, SUCH AS A CLOCK OR WATCH

The invention relates to a display device for a counting mechanism and comprising a first system of electrodes and a second system of electrodes, between which systems of electrodes a display medium is present, the said first system of electrodes comprising a ring of electrodes for each quantity to be displayed, said rings being substantially concentric and each comprising one electrode for each counting position to be displayed.

A counting mechanism is to be understood to mean within the scope of the present invention both a device which displays, for example, the hundreds, tens and units of a given quantity and a device which displays the hours, minutes and seconds of a given time or time duration.

A display device of the kind mentioned in the preamble is known from the article "Improved electronic watches" in "Proceedings of the I.E.E.E.", pp. 487–489, April, 1973. The display of the device described in this article with reference to FIG. 3C is so-called analog, which means that the display takes place by means of a scale on which a certain position is indicated. In contrast with the display of many analog pointer instruments, however, only discrete values can be displayed. In the displayed device described in the said article each counting position has an electrode with an individual connection. As a result of this the number of connections of the display device is very large. For displaying 24 positions for full hours and half hours, 60 positions for the minutes and 60 positions for the seconds, 24+60+60=144 connections are necessary for the electrodes for the first system, plus one connection for a common counter electrode which forms the second system.

It is the object of the invention to provide a display device of the kind described in the preamble having a minimum number of connections. For that purpose, such a display device is characterized in that the second system of electrodes consists of one ring of electrodes of which each electrode cooperates with all rings of the first system, and that the electrodes of each ring of the first system are divided into groups of adjacent electrodes having the same number per ring, each electrode of a group being interconnected to one electrode of each other group belonging to the same ring, all electrodes of one group cooperating with one electrode of the second system.

With the electrode configuration thus obtained it is possible, for example, to divide the said 144 positions over a matrix having 12×12=144 positions and only 12+12=24 connections as will become apparent from the description of the embodiment hereinafter.

A display device according to the invention is preferably constructed so that the said interconnections of the electrodes of a ring of the first system are present partly on the inside of the ring and partly on the outside of the ring and cross the ring at the area of an electrode, none of the interconnections crossing any other interconnection.

Such a configuration can be obtained when the electrodes of each group of a ring of the first system are arranged in a direction opposite to that of the electrodes of an adjacent group of the same ring interconnected to said electrodes.

A display device according to the invention is particularly suitable for use in a clockwork for a clock or a watch and then comprises preferably a first system of electrodes having a first ring with 24 electrodes for displaying whole and half hours, and a second ring having 60 electrodes for displaying minutes.

The first system of electrodes may comprise a third ring having 60 electrodes for displaying the number of seconds.

Particularly suitable display media for a display device according to the invention are the liquid crystals known from the art, for example, nematic liquid crystals which show the effect of the so-called dynamic scattering.

Another suitable display medium is formed by light emitting semiconductor diodes (so-called L.E.D.'s or light emitting diodes) which in any counting position are connected between an electrode of the first system and an electrode of the second system.

It is to be noted that two adjacent electrodes of one ring of the first system which are interconnected can be constructed as one electrode, in which, however, within the scope of the invention, said electrode is considered as two individual interconnected electrodes when it is operative in two counting positions. The electrodes of the second system may also each consist of a number of interconnected electrode segments of which each segment cooperates with a ring of the first system.

The invention will be described in greater detail with reference to the accompanying drawing, of which:

Figure 1:
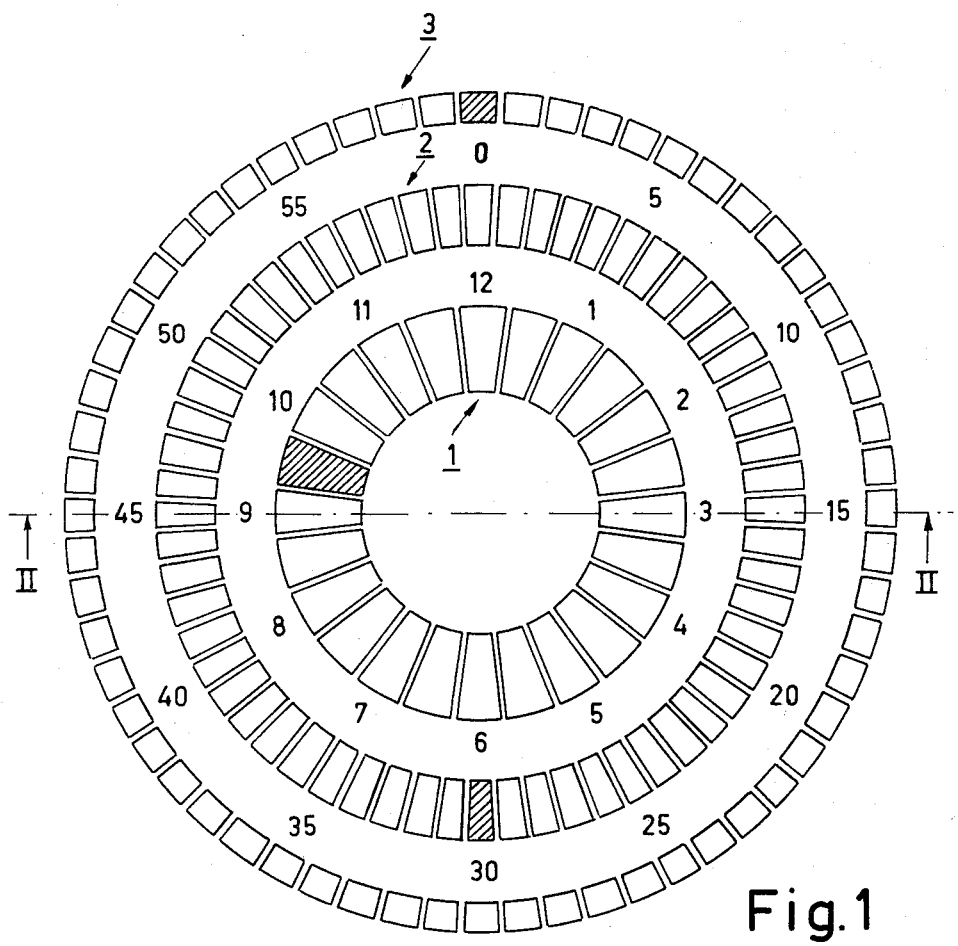
FIG. 1 is the elevation of a watch according to the invention.

In the watch shown in FIG. 1 the time is displayed by means of three concentric rings. The inner ring 1 comprises 24 positions for displaying whole and half hours. The central ring 2 comprises 60 positions for displaying minutes. The outer ring 3 comprises 60 positions for displaying seconds.

Figure 2:
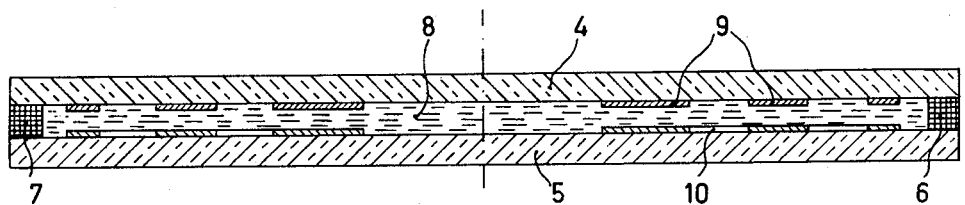
FIG. 2 is a cross-sectional view of the display device of said watch.
Figure 3:
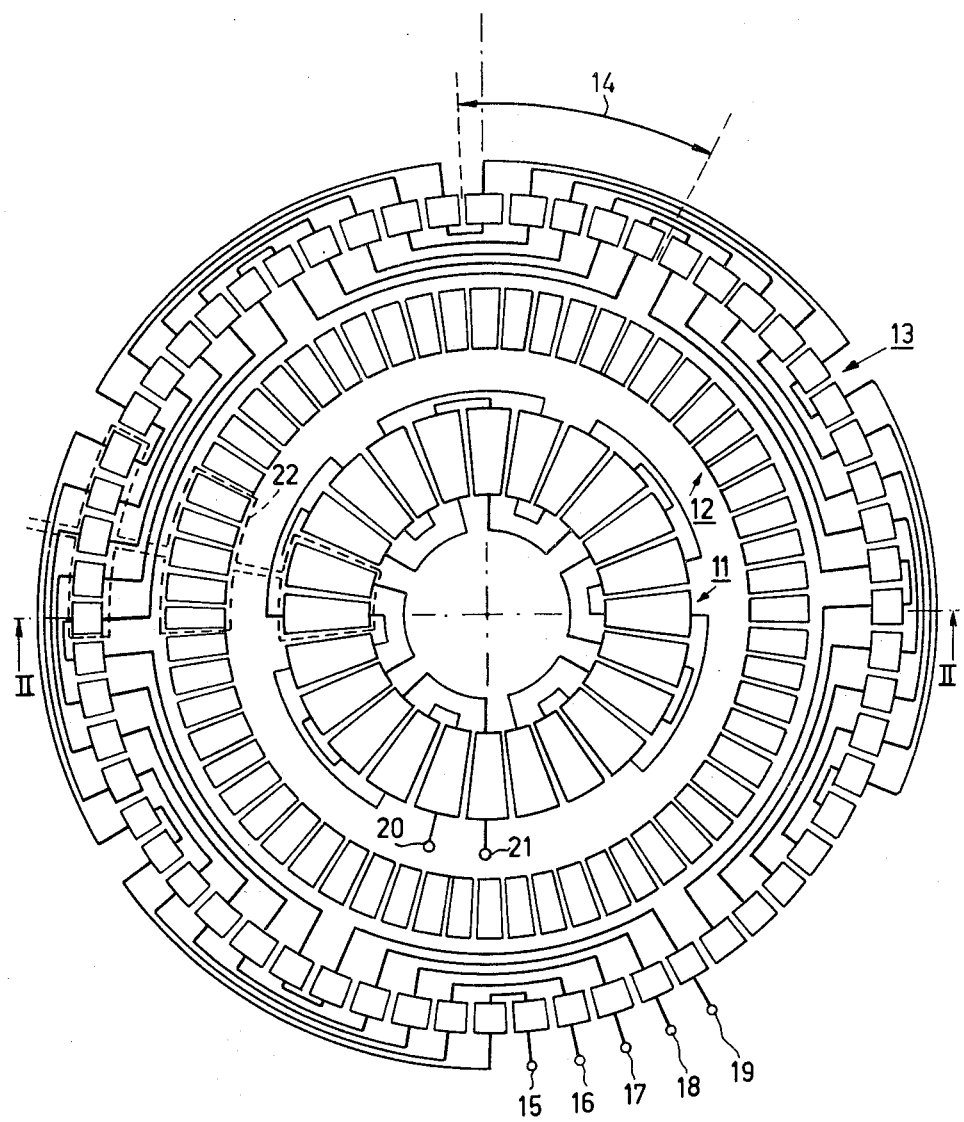
FIG. 3 shows a first system of electrodes of said watch.
Figure 4:
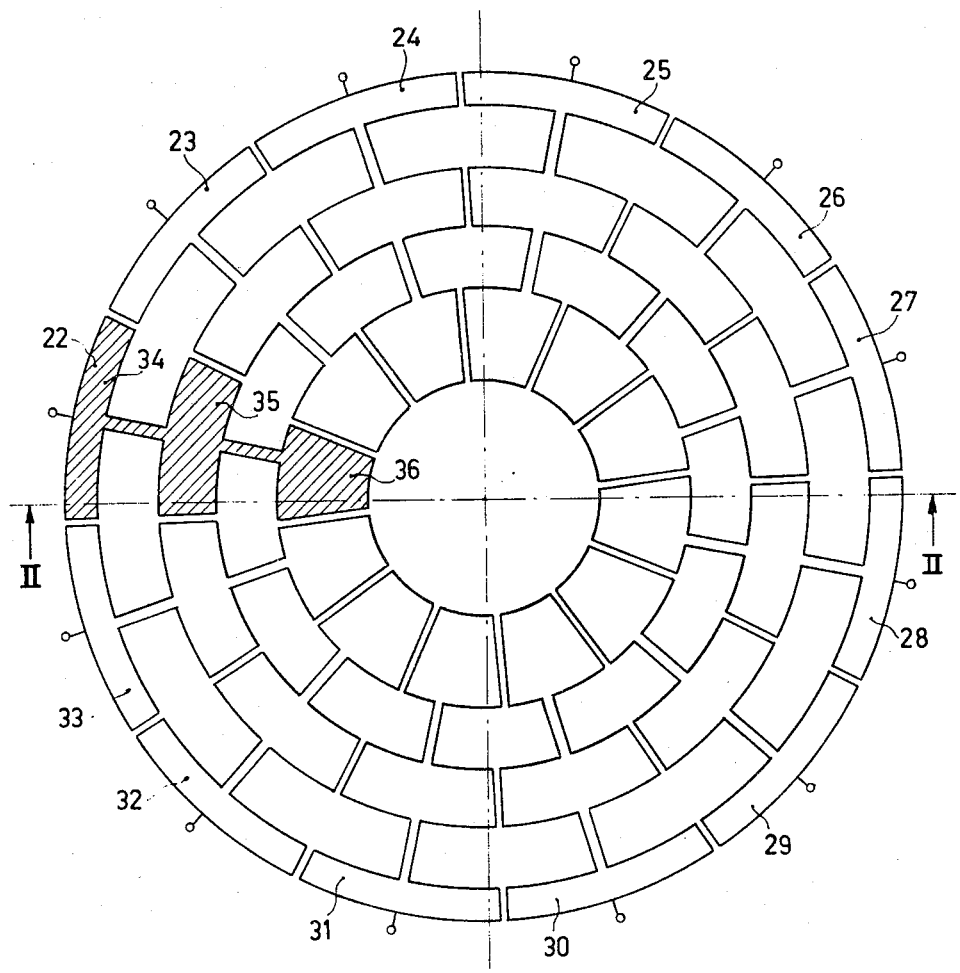
FIG. 4 shows the associated second system of electrodes.

As shown in FIG. 2, the display device of the watch comprises two supporting plates 4 and 5 which are fixed at a certain distance from each other by means of spacing members 6 and 7. The space 8 between the plates 4 and 5 is filled with a display medium and is sealed by the spacing members 6 and 7. A first system of electrodes 9 which will be described with reference to FIG. 3, is present on the inside of the supporting plate 4. A second system of electrodes 10 which will be described with reference to FIG. 4, is present on the inside of the supporting plate 5. A suitable display medium in the space 8 is a liquid crystal of the nematic type which scatters light under the influence of a voltage at an electrode of the system 9 and an electrode of the system 10 (dynamic scattering). Another suitable display medium is formed by light emitting semiconductor diodes (so-called L.E.D.'s or light emitting diodes) which in any counting position are connected between an electrode of the first system and an electrode of the second system. Such display media are known from the art and need not be further described, nor the constructive details which render a display device suitable for a given display medium.

A display device according to the invention receives signals on the electrodes of the system 9 and 10 such that always only one position (FIG. 1) is excited. In FIG. 1 the time 9 hours, 30 minutes and 0 seconds is displayed. The positions in the rings 1, 2 and 3 are successively excited at such a frequency that to the observer's eye it seems as if each position is continuously excited. An analog display with a device according to the invention has the advantage, as compared with a digital display, that an impression of the displayed time is obtained more rapidly without precisely reading. A further advantage is that each position of the ring 1 is connected only for 1/24 part of the time and each position of the rings 2 and 3 only for 1/60 part of the time. This is very much in favour of the life and a small current consumption and is in contrast with digital display in which the average time during which an element is connected is much larger. For exciting a given counting position the duty cycle is one third (100/3%) while in the case of digital display with, for example, six digits in matrix arrangement each built up of seven segments the duty cycle for each segment can be only one sixth (100/6%) or one seventh (100/7%). This is very much in favour of the contrast which can be achieved with a device according to the invention.

FIG. 3 shows the first system of electrodes 9 (FIG. 2) with the connections between the individual electrodes. The electrodes are grouped in a first ring 11, a second ring 12 and a third ring 13. The electrodes of the third ring 13 are divided into 12 groups of five electrodes. One of the groups is denoted by 14 by way of example. Each electrode of a group is interconnected to one electrode of each other group of the ring 13. The corresponding electrodes of adjacent groups of the ring 13 are arranged in the opposite direction. It is shown in FIG. 3 how all the electrodes can be interconnected in this manner without interconnections crossing each other. The voltage to the electrodes of the ring 13 is supplied from appropriate driving circuits such as shown, for example, in U.S. Pat. No. 3,754,392 via the five connections 15, 16, 17, 18 and 19. The second ring 12 is divided into 12 groups of five electrodes in quite the same manner. The interconnections of the electrodes of the second ring 12 are not shown in FIG. 3 so as to avoid unnecessary complexity of the drawing. The first ring 11 is also divided into 12 groups, however, of two electrodes per group. Therefore the ring 11 needs only two connections 20 and 21. A group of electrodes of the first ring 11, a group of electrodes of the second ring 12 and a group of electrodes of the third ring 13 cooperate with a kind of sector-like electrode of the second system 10 which is shown in FIG. 4. One of the 12 electrodes of the second system 10 is shown in broken lines in FIG. 3 (22).

FIG. 4 shows the second system of electrodes 10 (FIG. 2). The second system 10 consists of 12 electrodes 22–33. Each of the electrodes 22–33 is divided into three interconnected segments, for example, the segments 34, 35 and 36 of electrode 22. Each of the segments cooperates with a group of electrodes of the first system (FIG. 3). The mutual position of the electrodes 22–33 relative to the electrodes of the first system appears from the electrode 22 shown in broken lines in FIG. 3.

The first system of electrodes has totally 12 connections, namely two for the first ring 11, five for the second ring 12 and five for the third ring 13. The second system of electrodes which constitute the counter electrodes, also has 12 connections, namely one for each of the electrodes 22–33. By supplying a voltage to one of the connections of the first system with respect to one of the connections of the second system, exactly one position is excited. So in order to display the time shown in FIG. 1 a voltage pulse should successively be applied to: electrode 25 and connection 15, electrode 31 and a connection of the ring 12 (corresponding to connection 15 of ring 13), and electrode 22 and connection 21 of ring 11. The connections of the first and second system of electrodes can thus be distributed over a matrix having 12+12=24 connections and 12×12=144 display positions. Such a matrix can be controlled very efficiently with prior art electronic means.

FIG. 3 shows that each ring comprises a few electrodes which are situated beside each other and are interconnected. Of course such electrodes can be combined to form one electrode which even reduces the number of interconnections. The ring 11 then consists of 12 electrodes which are alternately connected together via a circular interconnection on the outside of the ring and a circular interconnection on the inside of the ring, respectively.

What is claimed is:

1. A display device of the dial plate type comprising a first system of electrodes and a second system of electrodes, a display medium between said first and second systems of electrodes, said first system of electrodes comprising at least two concentric rings of electrodes, each ring for displaying one quantity and comprising one electrode for each counting position to be displayed, said second system of electrodes comprising one ring of electrodes of which each electrode is in operative arrangement with all rings of the first system, the electrodes of each ring of said first system being divided into groups of adjacent electrodes having the same number per group, each electrode of a group being interconnected to one electrode of each other group belonging to the same ring, all electrodes of one group being in operative arrangement with only one electrode of the second system.

2. A display device as claimed in claim 1, wherein said interconnections of the electrodes of a ring of the first system are in one plane with the electrodes and located partly within the ring and partly outside of the ring and cross the ring at an electrode, none of the interconnections crossing another interconnection.

3. A display device as claimed in claim 2, wherein the electrodes of each group of a ring of the first system are arranged in a direction opposite to that of the electrodes of an adjacent group of the same ring interconnected to said electrodes.

4. A display device as claimed in claim 1, wherein the first system of electrodes comprises a first ring having 24 electrodes for displaying whole and half hours, and a second ring having 60 electrodes for displaying minutes.

5. A display device as claimed in claim 4, wherein the first system of electrodes comprises a third ring having 60 electrodes for displaying seconds.

6. A display device as claimed in claim 1, wherein the said display medium is a liquid crystal.

* * * * *